FIG. I
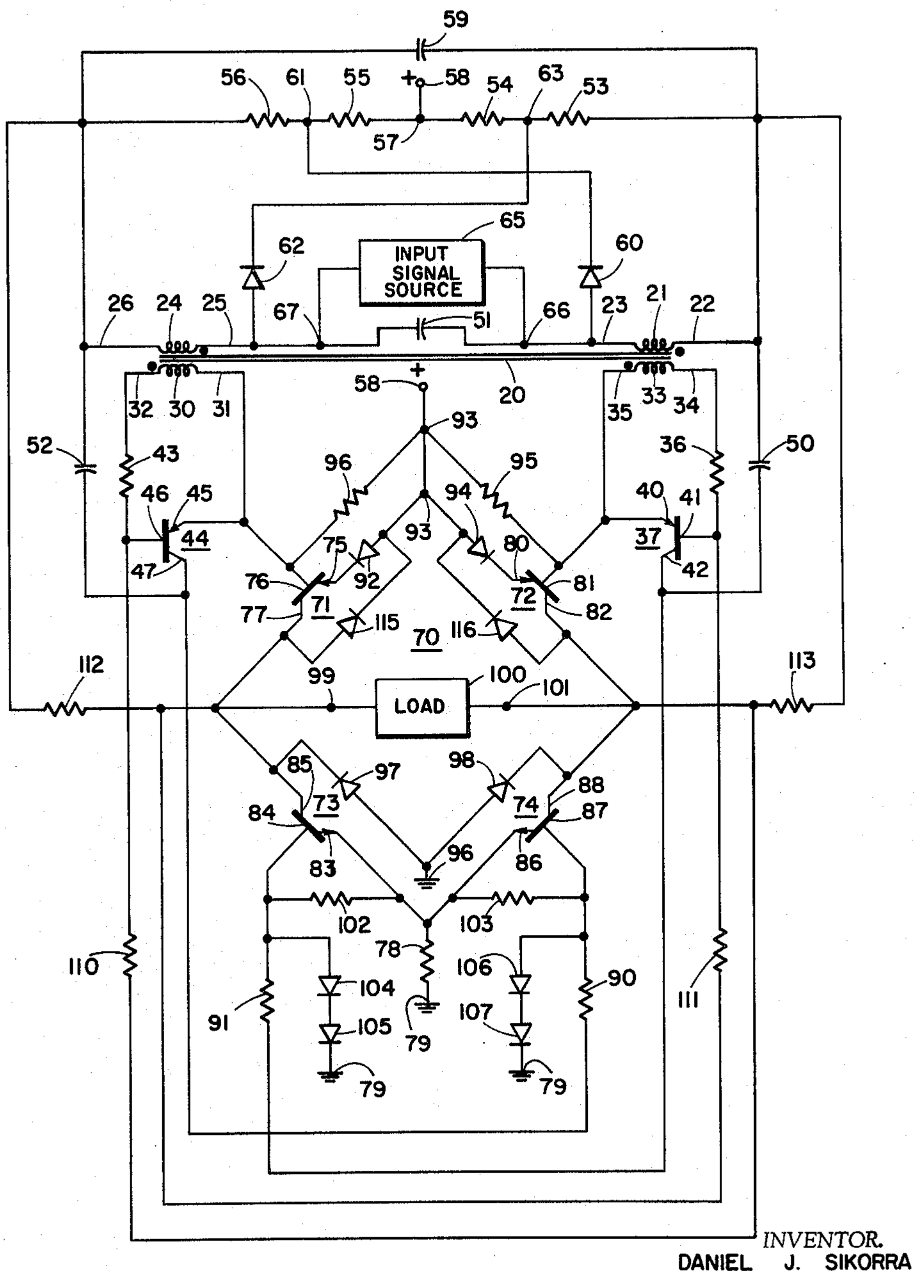
INVENTOR.
DANIEL J. SIKORRA
BY Roger W. Jensen
ATTORNEY.

INVENTOR.
DANIEL J. SIKORRA

BY Roger W. Jensen

ATTORNEY.

United States Patent Office 3,233,161

Patented Feb. 1, 1966

3,233,161

SATURABLE REACTOR AND TRANSISTOR BRIDGE VOLTAGE CONTROL APPARATUS

Daniel J. Sikorra, Champlin, Minn., assignor to Honeywell Inc., a corporation of Delaware Filed May 18, 1962, Ser. No. 195,917

14 Claims. (Cl. 318—257)

This invention pertains to improvements in control apparatus and more particularly to power amplifier circuits, and is very well suited for the control of two terminal loads, such as a permanent magnet D.C. motor.

In a broad sense the invention comprises a transistorized complementary symmetry bridge circuit having a source of energizing potential connected across one diagonal and a load, such as a permanent magnet D.C. motor, connected across the other diagonal.

The transistors of the bridge are energized by means of a signal controlled variable pulse width pulse generator comprising a saturable transformer connected in circuit with a pair of transistors, or other current control or switch means, so that the primary of the transformer is energized by the conduction of the transistors and the secondary of the transformer controls the conduction and nonconduction state of the transistors. Only one of the transistors is conducting at any given time and the saturation of the transformer determines when the transistors will change from their conducting to nonconducting state or vice versa.

The pulse generator output, during a no signal condition, is an alternating rectangular wave of constant magnitude, equal period, positive and negative conduction periods. A source of control signals is connected in circuit with the transformer primary to change the conduction time, but not the magnitude of the positive and negative conduction periods.

One of the pulse generator transistors is connected in circuit with the emitter-base electrodes of a diagonally opposite pair of the bridge transistors, while the other pulse generator transistor is connected in circuit with the base-emitter electrodes of the other pair of diagonally opposite bridge transistors. In this manner, the conduction of one of the pulse generator transistors causes an emitter to base current flow through each of the diagonally opposite transistors of the bridge circuit and thereby energizes these diagonally opposite transistors, and hence energizes the load by causing a first polarity potential to appear across the load. When the other transistor of the pulse generator conducts the other diagonally opposite pair of transistors will be energized and hence the load will be energized by an opposite polarity potential. If the two transistors of the pulse generator conduct for equal times the resultant time average potential across the load will be zero.

However, when an input signal is applied to the circuit, the conduction period of one of the pulse generator transistors will be greater than the conduction period of the other and hence the time average of the potential across the load will be some finite value and, in the case of a permanent magnet D.C. motor, the load will be energized and will revolve in a first direction.

It is one object of this invention to provide an improved power amplifier circuit.

It is another object of this invention to provide an improved power amplifier circuit particularly well adapted to the energization of two terminal reversible loads.

These and other objects of my invention will become apparent to those skilled in the art upon the consideration of the accompanying specification, claims, and drawings of which:

FIGURE 1 shows a schematic representation of an embodiment of this invention.

STRUCTURE OF FIGURE 1

Figure 3:
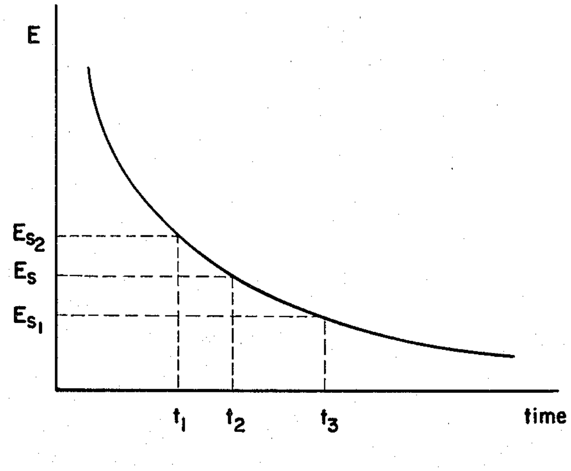
FIGURE 3 illustrates the effect of the input signal on the volt-time characteristic of the primaries of the saturable transformer of FIGURE 1.

Referring to FIGURE 1 there is shown a saturable transformer 20 having a first winding 21 having end terminals 22 and 23, a second winding 24 having end terminals 25 and 26, a third winding 30 having end terminals 31 and 32 and a fourth winding 33 having end terminals 34 and 35.

Terminal 34 of winding 33 is connected by means of a resistor 36 to a base 41 of a transistor 37. Transistor 37 further has an emitter 40 and a collector 42. Emitter 40 of transistor 37 is directly connected to terminal 35 of winding 33.

Terminal 32 of winding 30 is connected by means of a resistor 43 to a base 46 of a transformer 44. Transistor 44 further has an emitter 45 and a collector 47. Emitter 45 of transistor 44 is directly connected to terminal 31 of winding 30.

Collector 42 of transistor 37 is connected by means of a capacitor 50 to end terminal 22 of winding 21. End terminal 23 of winding 21, is connected by means of a capacitor 51 to the end terminal 25 of winding 24. End terminal 26 of winding 24 is connected by means of a capacitor 52 to the collector 47 of transistor 44. Terminal 22 of winding 21 is connected by means of a resistor 53, a resistor 54, a resistor 55, and a resistor 56, to the end terminal 26 of winding 24. A junction 57 between resistors 54 and 55 is connected directly to a source of positive energizing potential 58. End terminal 22 of winding 21 is further connected by means of a capacitor 59 to end terminal 26 of winding 24.

Terminal 23 of transformer winding 21 is connected by means of a diode 60 to a junction 61 between resistors 55 and 56, while end terminal 25 of transformer 24 is connected by means of a diode 62 to a junction 63 between resistors 53 and 54. An input signal source 65 is connected directly across capacitor 51 by means of a terminal 66 and a terminal 67.

A bridge circuit 70 comprises transistors 71, 72, 73, and 74. Transistors 71 and 72 are of one conductivity type while transistors 73 and 74 are of the opposite conductivity type. Transistor 71 has an emitter 75, a base 76 and a collector 77. Transistor 72 has an emitter 80, a base 81, and a collector 82. Transistor 73 has an emitter 83, a base 84, and a collector 85. Transistor 74 has an emitter 86, a base 87, and a collector 88.

Base 76 of transistor 71 is directly connected to the emitter 45 of transistor 44. Collector 47 of transistor 44 is connected by means of a resistor 90 to the base 87 of transistor 74. Similarly, base 81 of transistor 72 is directly connected to the emitter 40 of transistor 37. Collector 42 of transistor 37 is connected by means of a resistor 91 to the base 84 of transistor 73. Emitter 75 of transistor 71 is connected by means of a reverse poled diode 92 to a junction 93. Junction 93 is connected by means of a diode 94 to the emitter 80 of transistor 72, and by means of a resistor 95 to the base 81 of transistor 72. Junction 93 is further connected to the positive potential source 58, and by means of a resistor 96 to the base 76 of transistor 71.

Collector 77 of transistor 71 is directly connected to collector 85 of transistor 73. Similarly, collector 82 of transistor 72 is directly connected to collector 88 of transistor 74. Emitter 83 of transistor 73 is directly connected to emitter 86 of transistor 74, and is further connected by means of a resistor 78 to ground 79. Collector 85 of transistor 73 and collector 88 of transistor 73 are respectively connected by means of a reverse poled diode 97 and a reverse poled diode 98 to ground 96. A load terminal 99 is connected to the collector 77 of transistor 71, while a load terminal 101 is connected to the collector 82 of transistor 72. A load 100, for example a permanent magnet motor, is connected between load terminals 99 and 101.

Base 84 of transistor 73 is connected by means of a resistor 102 to the emitter 83 of transistor 73. A resistor 103 is connected between the base 87 and the emitter 86 of transistor 74. Base 84 of transistor 73 is connected by means of a diode 104 in series with a diode 105 to ground 79. Similarly, base 87 of transistor 74 is connected by means of a diode 106 in series with a diode 107 to ground 79.

Base 46 of transistor 44 is connected by means of a resistor 110 to the load terminal 101, while the base 41 of transistor 37 is connected by means of a resistor 111 to the load terminal 99. Load terminal 99 is further connected by means of a resistor 112 to the end terminal 26 of transformer winding 24, while load terminal 101 is connected by means of a resistor 113 to the end terminal 22 of transformer winding 21.

Junction 93 is connected by means of a reversed poled diode 115 and a reversed poled diode 116 to the collectors 77 and 82 of transistors 71 and 72 respectively.

OPERATION

In considering the operation of the circuit of FIGURE 1, assume initially that the signal from input signal source 65 is zero and that transistor 37 is just beginning to conduct. The conduction path for transistor 37 is from the positive potential source 58 through diode 94, emitter 80 to base 81 of transistor 72, emitter 40 to collector 42 of transistor 37, resistor 91, base 84 to emitter 83 of transistor 73, and resistor 78 to ground 79.

Since the conduction of transistor 37 causes an emitter to base current flow in transistor 72 and a base to emitter current flow in transistor 73 transistors 72 and 73 will both conduct. The conduction path for transistors 72 and 73 is from the positive potential source 58, through diode 94, emitter 80 to collector 82 of transistor 72, load 100, collector 85 to emitter 83 of transistor 73, and resistor 78 to ground 79.

The conduction of transistors 72 and 73 produces a potential drop across load 100 which causes load terminal 101 to become positive with respect to load terminal 99. This positive potential at load terminal 101 is coupled through resistor 113 to the end terminal 22 of transformer winding 21. The negative potential of load 99 is coupled through resistor 112 to end terminal 26 of transformer winding 24. This volt drop across the transformer primary windings will produce a primary current flow through the windings from terminal 22 through winding 21, capacitor 51, and winding 24 to end terminal 26. The primary current flow through primary winding 21 induces a voltage in transformer secondary winding 33 such that terminal 34 is negative with respect to terminal 35. This induced voltage is of a polarity that will increase the conduction of a transistor 37.

The primary current flow through winding 24 induces a voltage in transformer secondary winding 30 such that terminal 32 is positive with respect to terminal 35. This induced voltage in transformer secondary winding 30 is of such polarity as to hold transistor 44 in its nonconducting or "off" state. The increased conduction of transistor 37 further increases the emitter base current in transistor 72 and 73 and hence increases the conduction of these transistors. The increase in conduction of transistors 72 and 73 in turn increases the potential drop across load 100 and hence increases the volt drop across primary windings 20 and 24 of saturable transformer 20. This positive feedback continues until saturable transformer 20 is driven to saturation.

When saturable transformer 20 saturates, the voltage induced in transformer secondaries 30 and 33 disappears, and a back E.M.F. is generated due to the collapsing magnetic fields around secondary windings 30 and 33. These back E.M.F.'s are of a polarity such that the transistor 37 is turned off and transistor 44 is turned on. When transistor 44 conducts current will flow from the positive potential source 58 through diode 92, emitter 75 to base 76 of transistor 71, emitter 45 to collector 47 of transistor 44, resistor 90, base 87 to emitter 86 of transistor 74, and resistor 78 to ground 79.

Since the conduction of transistor 44 causes an emitter-base current flow in transistors 71 and 74, transistors 71 and 74 will also conduct and a current will flow from the positive potential source 58, through diode 92, emitter 75 to collector 77 of transistor 71, load 100, collector 88 to emitter 86 of transistor 74, and resistor 78 to ground 79.

The conduction of transistors 71 and 74 causes a potential drop across load 100 such that terminal 99 will be positive with respect to terminal 101, and this load voltage is coupled through resistor 112 to end terminal 26 of transformer primary winding 24, and through resistor 113 to end terminal 22 of transformer primary winding 21, and is of a polarity such that end terminal 26 is positive with respect to end terminal 22. This causes a primary current flow through the primary windings 24 and 21 such that the voltage induced in secondary winding 33 causes terminal 34 to become positive with respect to terminal 35. This induced voltage of secondary winding 33 is of a polarity such as to hold transistor 37 in its nonconducting or "off" state. Similarly, a primary current flow through primary winding 24 induces a voltage in secondary winding 30 such that terminal 31 is positive with respect to terminal 32. This induced voltage is of a polarity such that transistor 44 increases in conduction, and hence increases the conduction through the emitter base junctions of transistors 71 and 74. The increase in emitter base current flow in transistors 71 and 74 causes these transistors to conduct harder and hence increases the potential across load 100. As described herein before, the increase in potential across load 100 increases the volt drop across the transformer primary and hence the voltage induced in the secondary windings and further increases the current flow through transistor 44.

As in the case of the conduction of transistor 37, transistor 44 will continue to conduct until saturable transformer 20 is driven to saturation in the opposite direction, at which the time the voltages induced in the transformer secondaries will disappear and a back E.M.F. will be generated which will again turn transistor 37 "on" and transistor 44 "off."

Figure 2A:
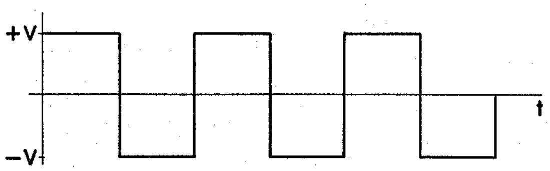
FIGURE 2A illustrates the idealized load voltage of FIGURE 1 in the absence of an input signal.

When the input signal from input signal source 65 is zero, the time required for transistor 37 to drive saturable transformer 20 to saturation is substantially the same as the time required by transistor 44 to drive transformer 20 to saturation. Hence, the conduction periods of transistors 37 and 44 are substantially equal and therefore the conduction periods of transistors 72 and 73 are substantially equal to the conduction periods of transformers 71 and 74. Since the conduction of transistors 71 and 74 produce a potential drop across the load of a first polarity while the conduction of transistors 72 and 73 produce a potential drop across the load of an opposite polarity, the time average polarity across the load, with no input signal from input signal source 65, is substantially zero. An idealized load voltage waveform, measured across load 100, is shown in FIGURE 2A.

Assume now that a D.C. input signal appears at the output of signal source 65 such that terminal 66 is positive with respect to terminal 67.

When transistor 44 conducts, transistors 71 and 74 also conduct and, as explained previously, the potential drop across load 100 is such that terminal 99 is positive with respect to terminal 101. This load voltage is coupled across the primary of saturable transformer 20 such that end terminal 26 of winding 24 is positive with respect to end terminal 22 of winding 21.

It can be readily seen that the input signal from source 65 is of a polarity such that it "aids" the load voltage applied across primary of transformer 20.

Since the volt-time product of the primary windings of saturable transformer 20 is a constant, when the energizing voltage increases, the time required to saturate the core must decrease. Since, as explained above, the input signal "aids" the load voltage applied across the primary of transformer 20 the time required to saturate the core when transistor 44 conducts decreases.

Assume that the input signal remains at the same polarity, that is, terminal 66 is positive with respect to terminal 67. When transistor 37 conducts, transistors 72 and 73 also conduct and hence the potential drop across load 100 is such that the terminal 101 of load 100 is positive to terminal 99. This load voltage will be coupled through resistors 112 and 113 to the primary of saturable transformer 20 and is such that the end terminal 22 of winding 21 will be positive with respect to end terminal 26 of winding 24. It can now be seen that the input signal from source 65 "opposes" the portion of the load voltage applied across the primary of saturable transformer 20 and hence the energizing voltage will be decreased. Since, as explained above, the volt-time product must remain a constant and since the energizing voltage is decreased, the time required to saturate the core must increase.

The effect of the input signal from source 65 upon circuit operation can be seen by referring to FIGURE 3 which shows a plot of the constant volt-time product for the transformer primaries. When the input signal is zero the voltage applied to primary windings 21 and 24 will be equal to a portion of the voltage dropped across load 100. This voltage is represented by $E_s$ in FIGURE 3.

When $E_s$ is applied to the transformer windings 21 and 24 the conduction time of the positive and negative conduction periods will be equal to $t_2$.

However, when an input signal is applied to the transformer primaries, such that terminal 66 is positive with respect to terminal 67, the input signal will add to the portion of the load voltage applied across the primaries when transistor 44 conducts and will subtract from the portion of the load voltage applied across the primaries when transistor 37 conducts.

From FIGURE 3 it can be seen that when $E_{s_2}$ is applied to the transformer primaries the time required to drive the core to saturation, that is, $t_1$, has decreased, while when $E_{s_1}$ is applied to the transformer primaries the time required to drive the core to saturation, that is, $t_3$, has increased.

Since the conduction times of transistors 37 and 44 are no longer equal, and since the conduction of transistors 71 and 74 and transistors 72 and 73 equal the conduction times of transistors 44 and 37 respectively, the time average of the potential drop across load 100 in one direction no longer equals the time average of the potential drop across the load in the opposite direction and hence the time average energization of load 100 is no longer zero but is rather some finite value. If, for example, load 100 is a D.C. permanent motor, the energization of this motor by the finite time average potential drop will cause the motor to revolve in one direction. If the input signal from signal source 65 had been of the opposite polarity, that is terminal 67 positive with respect to terminal 66, the finite time average of the potential drop across load 100 would be in the opposite direction and hence the motor would revolve in the opposite direction.

Figure 2B:
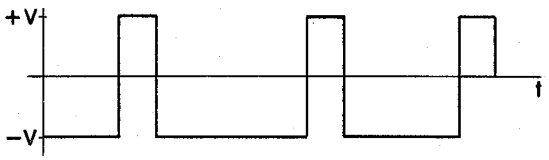
FIGURE 2B illustrates the idealized load voltage of FIGURE 1 when an input signal is present.

FIGURE 2B shows an idealized load voltage waveform, measured across load 100, when input signal terminal 66 is positive with respect to terminal 67.

Resistor 110, connected from the base 46 of transistor 44 to terminal 101 of load 100, and resistor 111, connected from base 41 of transistor 37 to the terminal 99 of load 100, provide auxiliary feedback paths to the transistors 37 and 44 and increase the modulation ratio of the output pulses to approximately 100 percent. Without these feedback paths the practical modulation ratio of the pulse generator is substantially less than 100 percent.

The operation without auxiliary feedback can be explained as follows: assume that resistors 110 and 111 are disconnected from the circuit; that transistor 37 is conducting and that a signal is present at the output of signal source 65 such that terminal 66 is positive with respect to terminal 67. The conduction of transistor 37, and the subsequent conduction of transistors 72 and 73, produce a volt drop across load 100 such that terminal 101 is positive with respect to terminal 99. As explained previously, this signal is coupled to the primary of saturable transformer 20 such that end terminal 22 of winding 21 is positive with respect to end terminal 26 of winding 24. Since the input signal from source 65 is making terminal 66 positive at the same time that the load voltage is making terminal 22 of winding 21 positive, it can be seen that as the magnitude of the input signal increases, the voltage across winding 21 will decrease and hence the voltage induced in the secondary windings 30 and 33 will also decrease. As the magnitude of the input signal from source 65 is increased still further, eventually the point will be reached where the voltage induced in secondary winding 33 is no longer sufficient to maintain an emitter to base current flow in transistor 37 and transistor 37 will be "starved" out thereby resulting in erratic generator operation.

The operation with auxiliary feedback is as follows: assume now that resistors 110 and 111 are again connected into the circuit. Since transistor 37 is conducting, the volt drop across load 100 is such that terminal 101 is positive with respect to terminal 99. The positive potential at terminal 101 is coupled through the collector base junction of transistor 72 to the emitter 40 of transistor 37, while the negative potential of terminal 99 of load 100 is coupled through resistor 111 to the base 41 of transistor 37. Hence transistor 37 has an auxiliary emitter base current flow path from the positive potential source 58 through diode 94, emitter 80 to base 81 of transistor 72, emitter 40 to base 41 of transistor 37, resistor 111, collector 85 to emitter 83 of transistor 73, and resistor 78 to ground 79. Therefore, as the magnitude of the input signal from signal source 65 increases, the decrease in induced voltage in secondary winding 33 no longer results in an insufficient emitter to base current flow in transistor 37 and hence the modulation ratio is proportionately increased.

This invention also includes several protection devices which protect the bridge transistors during excessive current conditions. For instance, diodes 104 and 105, serially connected from the base 84 of transistor 73 to ground and diodes 106 and 107 serially connected from the base 87 of transistor 74 to ground, protect the bridge transistors in the event that the load 100 is shorted. In normal operation, when transistor 73 conducts the potential on its base 84 will be slightly less than the breakdown potential of diodes 104 and 105. In the event that the load 100 shorts, the current through transistor 73 will increase thereby increasing the volt drop across resistor 78 and hence increasing the potential on the base 84 of transistor 73. When the potential on base 84 increases above the breakdown potential of diodes 104 and 105, these diodes will conduct and will bypass the base emitter junction of transistor 73. Therefore, the conduction of control transistor 37 will no longer be through the base to emitter junction of transistor 73, but will instead be bypassed by diodes 104 and 105. This results in a decrease in conduction of transistor 73 which in turn limits the conduction of transistor 72 and also the shorted load current.

The operation of diodes 106 and 107 associated with transistor 74 is the same.

Another important function of diodes 104 and 105, and 106 and 107, is that they limit the bridge transistor current during the switching operation. As explained previously, transistors 71 and 74 conduct during one period of operation while transistors 72 and 73 conduct during another period of operation. However, the turn "on" and turn "off" characteristics of these transistor pairs, are not absolutely coincident, and hence there will be some overlap of conduction times. In other words, there will be a very short time when both transistors 71 and 73 will be conducting. This results in a substantially short circuit across the source 58. The diodes 104 and 105 and 106 and 107 prevent the bridge transistors from burning out during the short overlap.

Diodes 97, 98, 115, and 116 connected across transistors 73, 74, 71, and 72 respectively, protect the bridge transistors from inverse current flows when an inductive load is used. This is preferred since the reverse current gain characteristics of the bridge transistors are not necessarily equal with the forward current gain characteristics and hence the bridge transistors might possibly be destroyed.

Figure 4:
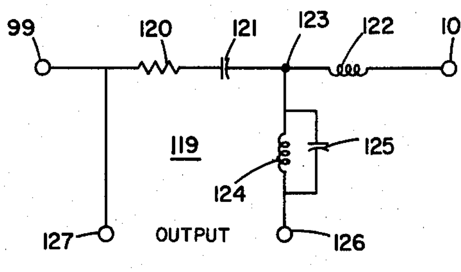
FIGURE 4 shows a filter circuit suitable for use in a second embodiment of this invention.

FIGURE 4 shows a low pass filter arrangement having input terminals adapted to be connected to load terminals 99 and 101. Load terminal 99 is connected by means of a resistor 120, a capacitor 121, and an inductance 122, to load terminal 101. A junction 123 between capacitor 121 and inductance 122 is connected by means of an inductance 124 in parallel with a capacitance 125 to an output terminal 126. Load terminal 99 is directly connected to an output terminal 127.

With low pass filter 119 connected across load terminals 99 and 101, the circuit of FIGURE 1 becomes a stable, low distortion, low frequency amplifier. Filter 119 acts to suppress the carrier frequency of the pulse generator. The input signal source 65 can be either a D.C. or an A.C. signal source.

It is to be understood that while I have shown a specific embodiment of my invention, that this is for the purpose of illustration only, and that my invention is to be limited only by the scope of the appended claims.

What is claimed is:

1. Apparatus of the class described comprising:
first, second, third and fourth transistors each having a base-emitter junction, said first and second transistors being of an opposite conductivity type to said third and fourth transistors;
a bridge circuit having a first branch including said first and third transistors connected in series, and
a second branch including said second and fourth transistors connected in series;
a source of energizing potential connected across one diagonal of said bridge circuit;
load means connected across the other diagonal of said bridge circuit;
fifth and sixth transistors each having a collector electrode, a base electrode, and an emitter electrode;
first and second current paths, said first current path including said fifth transistor and the base-emitter junctions of said first and fourth transistors and said second current path including said sixth transistor and the base-emitter junction of said second and third transistors;
a magnetic core having first, second, third, and fourth windings wound in inductive relation thereto;
means connecting said first and second windings in series across said collector electrodes of said fifth and sixth transistors;
means connecting said third and fourth windings from the emitter to base electrodes of said fifth and sixth transistors respectively;
and means adapted to connect a source of input signals in circuit with said first and second windings.

2. Apparatus of the class described comprising:
first, second, third and fourth transistors each having a collector electrode, a base electrode and an emitter electrode, said first and second transistors being of an opposite conductivity type to said third and fourth transistors;
a bridge circuit having a first branch including said first and third transistors connected in series, and a second branch including said second and fourth transistors connected in series;
a source of energizing potential;
means connecting said source of energizing potential across one diagonal of said bridge circuit;
filter means having an input and an output;
means connecting the input of said filter means across the other diagonal of said bridge circuit;
diode means connected across each of the transistors of said bridge circuit and poled so as to conduct any current tending to flow in the reverse direction through said transistors;
and voltage breakdown devices connected from the base electrode of said third and fourth transistors respectively to ground, the breakdown potential of said devices being slightly higher than the normal operating potential on said base electrode.

3. Apparatus of the class described comprising:
first, second, third and fourth switch means each having an energizing electrode;
a bridge circuit having a first branch including said first and third switch means connected in series, and
a second branch including said second and fourth switch means connected in series;
a source of energizing potential connected across one diagonal of said bridge circuit;
load means connected across the other diagonal of said bridge circuit;
first and second current control means each having a conducting and non-conducting state;
first and second current paths, said first current path including said first current control means and the energizing electrodes of said first and fourth switch means and said second current path including said second current control means and the energizing electrodes of said second and third switch means;
and means connected to said first and second current control means to vary the conduction time of said control means.

4. Apparatus of the class described comprising:
first, second, third and fourth transistors each having a base emitter junction, said first and second transistors being of an opposite conductivity type to said third and fourth transistors;
a bridge circuit having a first branch including said first and third transistors connected in series, and a second branch including said second and fourth transistors connected in series;
a source of energizing potential connected across one diagonal of said bridge circuit;
load means connected across the other diagonal of said bridge circuit;
first and second current control means each having a conducting and non-conducting state;
first and second current paths, said first current path including said first current control means and the base-emitter junctions of said first and fourth transistors and said second current path including said second current control means and the base-emitter junctions of said second and third transistors;
and means connected to said first and second current control means to vary the conduction time of said control means.

5. Apparatus of the class described comprising:
a transistorized complementary symmetry bridge circuit, each of the transistors of said bridge circuit having an emitter-base junction;
a source of energizing potential connected across one diagonal of said bridge circuit;
filter means having an input and an output;
means connecting the input of said filter means across the other diagonal of said bridge;
first and second current control means;
first and second current paths, said first current path including said first current control means and the emitter-base junctions of a first opposite pair of transistors of said bridge and said second current path including said second current control means and the emitter-base junctions of a second opposite pair of transistors of said bridge;
a magnetic core having first, second, third and fourth windings wound in inductive relation thereto;
means connecting said first and second windings in series from said first current control means to said second current control means;
means connecting said third and fourth windings to said first and second current control means respectively whereby any signal induced in said third and fourth windings operate said current control means to establish periodically a current conducting condition in said first path and a nonconducting condition in said second path followed by a nonconducting condition in said first path and a conducting condition in said second path;
and means adapted to connect a source of control signals in circuit with said first and second windings to vary the conducting period of said first and second current control means.

6. Apparatus of the class described comprising:
first, second, third and forth transistors each having a collector electrode, a base electrode and an emitter electrode, said first and second transistors being of an opposite conductivity type to said third and fourth transistors;
a bridge circuit having a first branch including said first and third transistors connected in series, and a second branch including said second and fourth transistors connected in series;
a source of energizing potential;
means connecting said source of energizing potential across one diagonal of said bridge circuit;
load means connected across the other diagonal of said bridge circuit;
diode means connected across each of the transistors of said bridge circuit and poled so as to conduct any current tending to flow in the reverse direction through said transistors;
and voltage breakdown devices connected from the base electrodes of said third and fourth transistors respectively to ground the breakdown potential of said devices being slightly higher than the normal operating potential on said base electrodes.

7. Apparatus of the class described comprising:
a transistorized complementary symmetry bridge circuit, each of the transistors of said bridge circuit having an emitter-base junction;
a source of energizing potential connected across one diagonal of said bridge circuit;
a D.C. permannet magnet motor connected across the other diagonal of said bridge;
first and second current control means;
first and second current paths, said first current path including said first current control means and the emitter-base junctions of a first diagonally opposite pair of transistors of said bridge and said second current path including said second current control means and the emitter-base junctions of a second diagonally opposite pair of transistors of said bridge;
a magnetic core having first, second, third and fourth windings wound in inductive relation thereto;
means connecting said first and second windings in series from said first current control means to said second current control means;
means connecting said third and fourth windings to said first and second current control means respectively whereby any signal induced in said third and fourth windings operate said current control means to establish periodically a current conducting condition in said first path and a non-conducting condition in said second path followed by a non-conducting condition in said first path and a conducting condition in said second path;
and means adapted to connect a source of control signals in circuit with said first and second windings to vary the conducting period of said first and second current control means.

8. Apparatus of the class described comprising:
first, second, third and fourth switch means each having an energizing electrode;
a bridge circuit having a first branch including said first and third switch means connected in series, and a second branch including said second and fourth switch means connected in series;
a source of energizing potential connected across one diagonal of said bridge circuit;
load means connected across the other diagonal of said bridge circuit;
first and second transistors each having a collector electrode, a base electrode, and an emitter electrode;
first and second current paths, said first current path including said first transistor and the energizing electrodes of said first and fourth switch means and said second current path including said second transistor and the energizing electrodes of said second and third switch means;
a magnetic core having first, second, third and fourth windings wound in inductive relation thereto;
means connecting said first and second windings in series across said collector electrodes of said first and second transistors;
means connecting said third and fourth windings from the emitter to base electrodes of said first and second transistors respectively;
and means adapted to connect a source of input signals in circuit with said first and second windings.

9. Apparatus of the class described comprising:
first, second, third and fourth transistors each having a collector electrode, a base electrode and an emitter electrode, said first and second transistors being of an opposite conductivity type to said third and fourth transistors;
a bridge circuit having a first branch including said first and third transistors connected in series, and a second branch including said second and fourth transistors connected in series;
a source of energizing potential;
means connecting said source of energizing potential across one diagonal of said bridge circuit;
low pass filter means having input and output terminals;
means connecting the input terminals of said low pass filter means across the other diagonal of said bridge circuit;
diode means connected across each of the transistors of said bridge circuit and poled so as to conduct any current tending to flow in the reverse direction through said transistors;
voltage breakdown devices connected from the base electrode of said third and fourth transistors respectively to ground, the breakdown potential of said devices being slightly higher than the normal operating potential on said base electrode;
first and second current control means;
first and second current paths, said first current path including said first current control means and the emitter and base electrodes of said first and fourth transistors of said bridge and said second current path including said second current control means and the emitter and base electrodes of said second and third transistors of said bridge;

a magnetic core having first, second, third and fourth windings wound in inductive relation thereto;

means connecting said first and second windings in series from said first current control means to said second current control means;

means connecting said third and fourth windings to said first and second current control means respectively whereby any signal induced in said third and fourth windings operate said current control means to establish periodically a current conducting condition in said first path and a non-conducting condition in said second path followed by a non-conducting condition in said first path and a current conducting condition in said second path;

means adapted to connect a source of control signals in circuit with said first and second windings to vary the conducting period of said first and second current control means;

and means connecting the input terminals of said low pass filter means to said first and second current control means so that the voltage across said input terminals acts as a biasing means for said current control means.

10. Apparatus of the class described comprising:

first, second, third, and fourth transistors each having a collector electrode, a base electrode, and an emitter electrode, said first and second transistors being of an opposite conductivity type to said third and fourth transistors;

a bridge circuit having a first branch including said first and third transistors connected in series, and a second branch including said second and fourth transistors connected in series;

diode means connected across each of the transistors of said bridge circuit and poled so as to conduct any current tending to flow in the reverse direction through said transistors;

voltage breakdown devices connected from the base electrodes of said third and fourth transistors respectively to ground, the breakdown potential of said devices being slightly higher than the usual operating potential on said base electrode;

a source of energizing potential;

means connecting said source of energizing potential across one diagonal of said bridge circuit;

load means connected across the other diagonal of said bridge circuit;

fifth and sixth transistors each having a collector electrode, a base electrode, and an emitter electrode; first and second current paths, said first current paths including said fifth transistor and the base and emitter electrodes of said first and fourth transistors and said second current path including said sixth transistor and the base and emitter electrodes of said second and third transistors;

a magnetic core having first, second, third, and fourth windings wound in inductive relation thereto;

means connecting said first and second windings in series across said collector electrodes of said fifth and sixth transistors;

means connecting said third and fourth windings from the emitter to base electrodes of said fifth and sixth transistors respectively;

and means adapted to connect a source of input signals in circuit with said first and second windings.

11. Apparatus of the class described comprising:

first, second, third, and fourth transistors each having a collector electrode, a base electrode, and an emitter electrode, said first and second transistors being of an opposite conductivity type to said third and fourth transistors;

a bridge circuit having a first branch including said first and third transistors connected in series, and a second branch including said second and fourth transistors connected in series;

diode means connected across each of the transistors of said bridge circuit and poled so as to conduct any current tending to flow in the reverse direction through said transistors;

voltage breakdown devices connected from the base electrodes of said third and fourth transistors respectively to ground, the breakdown potential of said devices being slightly higher than the usual operating potential on said base electrode;

a source of energizing potential;

means connecting said source of energizing potential across one diagonal of said bridge circuit;

low pass filter means having input terminals and output terminals;

means connecting the input terminals of said low pass filter means across the other diagonal of said bridge circuit;

fifth and sixth transistors each having a collector electrode, a base electrode, and an emitter electrode; first and second current paths, said first current paths including said fifth transistor and the base and emitter electrodes of said first and fourth transistors and said second current path including said sixth transistor and the base and emitter electrodes of said second and third transistors;

a magnetic core having first, second, third, and fourth windings wound in inductive relation thereto;

means connecting said first and second windings in series across said collector electrodes of said fifth and sixth transistors;

means connecting said third and fourth windings from the emitter to base electrodes of said fifth and sixth transistors respectively;

and means adapted to connect a source of input signals in circuit with said first and second windings.

12. Apparatus of the class described comprising:

a transistorized complementary symmetry bridge circuit, each of the transistors of said bridge circuit having an emitter-base junction;

a source of energizing potential connected across one diagonal on said bridge circuit;

load means connected across the other diagonal of said bridge;

first and second current control means;

first and second current paths, said first current path including said first current control means and the emitter-base junctions of a first opposite pair of transistors of said bridge and said second current path including said second current control means and the emitter-base junctions of a second opposite pair of transistors of said bridge;

a magnetic core having first, second, third and fourth windings wound in inductive relation thereto;

means connecting said first and second windings in series from said first current control means to said second current control means;

means connecting said third and fourth windings to said first and second current control means respectively whereby any signal induced in said third and fourth windings operate said current control means to establish periodically a current conducting condition in said first path and a nonconducting condition in said second path followed by a nonconducting condition in said first path and a conducting condition in said second path;

means adapted to connect a source of control signals in circuit with said first and second windings to vary the conducting period of said first and second current control means;

and means connecting the load voltage as a biasing potential for said first and second current control means.

13. Apparatus of the class described comprising:
first, second, third and fourth transistors each having a collector electrode, a base electrode and an emitter electrode, said first and second transistors being of an opposite conductivity type to said third and fourth transistors;
a bridge circuit having a first branch including said first and third transistors connected in series, and a second branch including said second and fourth transistors connected in series;
a source of energizing potential;
means connecting said source of energizing potential across one diagonal of said bridge circuit;
load means connected across the other diagonal of said bridge circuit;
diode means connected across each of the transistors of said bridge circuit and poled so as to conduct any current tending to flow in the reverse direction through said transistors;
voltage breakdown devices connected from the base electrode of said third and fourth transistors respectively to ground, the breakdown potential of said devices being slightly higher than the normal operating potential on said base electrode;
first and second current control means;
first and second current paths, said first current path including said first current control means and the emitter and base electrodes of said first and fourth transistors of said bridge and said second current path including said second current control means and the emitter and base electrodes of said second and third transistors of said bridge;
a magnetic core having first, second, third and fourth windings wound in inductive relation thereto;
means connecting said first and second windings in series from said first current control means to said second current control means;
means connecting said third and fourth windings to said first and second current control means respectively whereby any signal induced in said third and fourth windings operate said current control means to establish periodically a current conducting condition in said first path and a non-conducting condition in said second path followed by a non-conducting condition in said first path and a current conducting condition in said second path;
means adapted to connect a source of control signals in circuit with said first and second windings to vary the conducting period of said first and second current control means;
and means connecting said load means to said first and second current control means so that the load voltage acts as a biasing means for said current control means.

14. Apparatus of the class described comprising:
first, second, third, and fourth transistors each having a collector electrode, a base electrode, and an emitter electrode, said first and second transistors being of an opposite conductivity type to said third and fourth transistors;
a bridge circuit having a first branch including said first and third transistors connected in series, and a second branch including said second and fourth transistors connected in series;
diode means connected across each of the transistors of said bridge circuit and poled so as to conduct any current tending to flow in the reverse direction through said transistors;
voltage breakdown devices connected from the base electrodes of said third and fourth transistors respectively to ground, the breakdown potential of said devices being slightly higher than the usual operating potential on said base electrode;
a source of energizing potential;
means connecting said source of energizing potential across one diagonal of said bridge circuit;
load means connected across the other diagonal of said bridge circuit;
fifth and sixth transistors each having a collector electrode, a base electrode, and an emitter electrode;
first and second current paths, said first current paths including said fifth transistor and the base and emitter electrodes of said first and fourth transistors and said second current path including said sixth transistor and the base and emitter electrodes of said second and third transistors;
a magnetic core having first, second, third, and fourth windings wound in inductive relation thereto;
means connecting said first and second windings in series across said collector electrodes of said fifth and sixth transistors;
means connecting said third and fourth windings from the emitter to base electrodes of said fifth and sixth transistors respectively;
means adapted to connect a source of input signals in circuit with said first and second windings;
and means connecting said load means to base electrodes of said fifth and sixth transistors whereby the load voltage provides a biasing potential for said fifth and sixth transistors.

References Cited by the Examiner

UNITED STATES PATENTS

| | | | |
|---|---|---|---|
| 1,851,692 | 3/1932 | Zucker | 318—432 |
| 2,965,833 | 12/1960 | Jensen | 323—45 |
| 2,972,710 | 2/1961 | D'Amico | 317—148.5 |
| 3,074,030 | 1/1963 | Hierholzer | 331—113 |

LLOYD McCOLLUM, *Primary Examiner.*